United States Patent
Choi

(10) Patent No.: US 9,075,521 B2
(45) Date of Patent: Jul. 7, 2015

(54) ELECTRONIC CHALKBOARD SYSTEM AND CONTROL METHOD THEREOF AND DISPLAY APPARATUS

(71) Applicant: Samsung Electronics Co., Ltd., Suwon-si (KR)

(72) Inventor: Hyun-mook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 13/868,694

(22) Filed: Apr. 23, 2013

(65) Prior Publication Data

US 2013/0335350 A1 Dec. 19, 2013

(30) Foreign Application Priority Data

Jun. 13, 2012 (KR) .................. 10-2012-0063069

(51) Int. Cl.
*G06F 3/041* (2006.01)
*G06F 3/0488* (2013.01)
*G06F 3/14* (2006.01)

(52) U.S. Cl.
CPC ............ *G06F 3/0488* (2013.01); *G06F 3/0416* (2013.01); *G06F 3/1431* (2013.01); *G06F 3/1446* (2013.01)

(58) Field of Classification Search
CPC ... G06F 3/0416; G06F 3/0488; G06F 3/1431; G06F 3/1446; G06F 3/14
USPC ......... 345/173, 175, 161, 167, 179, 441, 157; 715/773; 358/403
See application file for complete search history.

(56) References Cited

U.S. PATENT DOCUMENTS

| 4,737,916 | A | * | 4/1988 | Ogawa et al. ................. 701/532 |
| 5,172,245 | A | * | 12/1992 | Kita et al. ..................... 358/403 |
| 6,128,014 | A | | 10/2000 | Nakagawa et al. |
| 6,219,068 | B1 | * | 4/2001 | Kumada et al. ............... 345/441 |
| 2009/0309853 | A1 | * | 12/2009 | Hildebrandt et al. ......... 345/175 |
| 2010/0149125 | A1 | | 6/2010 | Klinghult et al. |

(Continued)

FOREIGN PATENT DOCUMENTS

| KR | 200199233 A | 10/2000 |
| KR | 10-2007-0039036 A | 4/2007 |

(Continued)

OTHER PUBLICATIONS

International Search Report (PCT/ISA/210) dated Sep. 17, 2013 issued by the International Searching Authority in International Application No. PCT/KR2013/003583.

*Primary Examiner* — Thuy Pardo
(74) *Attorney, Agent, or Firm* — Sughrue Mion, PLLC

(57) ABSTRACT

An electronic chalkboard system including a plurality of display panels, a pointing device which touches the plurality of panels, an image processor which processes an image to be displayed on one of the plurality of panels that is drawn by the pointing device, a controller which selects one of the plurality of panels based on a first panel of the plurality of panels if the first panel is touched by the pointing device, and controls the image processor to display on the selected panel a menu related to the image displayed on the first panel, and, if a second panel of the plurality of panels is touched by the pointing device while the menu is displayed on the selected panel, the controller newly selects one of the plurality of panels based on the second panel and transfers the displayed menu to the newly-selected panel.

27 Claims, 12 Drawing Sheets

(56) References Cited

U.S. PATENT DOCUMENTS

2012/0030594 A1* 2/2012 Yokoyama et al. ........... 715/765
2012/0159372 A1* 6/2012 Stallings et al. .............. 715/773

FOREIGN PATENT DOCUMENTS

| KR | 1020080094200 A | 10/2008 |
|----|-----------------|---------|
| KR | 1020090042686 A | 4/2009  |

* cited by examiner

ELECTRONIC CHALKBOARD SYSTEM AND CONTROL METHOD THEREOF AND DISPLAY APPARATUS

CROSS-REFERENCE TO RELATED APPLICATION

This application claims priority from Korean Patent Application No. 10-2012-0063069, filed on Jun. 13, 2012 in the Korean Intellectual Property Office, the disclosure of which is incorporated herein by reference in its entirety.

BACKGROUND

1. Field

Apparatuses and methods consistent with exemplary embodiments relate to an electronic chalkboard system and a control method thereof and a display apparatus, and more particularly, to an electronic chalkboard system and a control method thereof and a display apparatus that identifies a display panel that is touched by a pointing device in the electronic chalkboard system including a plurality of display panels and uses information about the identified display panel to provide a convenient user experience.

2. Description of the Related Art

A display apparatus processes image signals/image data which are input from the outside or stored therein, according to various image processing operations and displays an image on a display panel or a screen based on the processed image signals/image data. The display apparatus may be implemented as a television (TV), a monitor, a portable media player (PD), etc. The display apparatus may be part of an electronic chalkboard system in which the display apparatus is supplemented with various functions including a pointing device that touches or scans a light beam to a display panel.

The electronic chalkboard system may detect a trajectory formed by the pointing device in a display panel or a screen and display an image on the display panel or screen corresponding to the detected trajectory. The electronic chalkboard system may be implemented using a display panel that is a resistive touch screen that senses pressure on the panel by the pointing device, or a using a charge coupled device (CCD) camera that senses coordinates of light which are formed on a screen by a light beam projected by the pointing device. If the display panel includes a plasma display panel (PDP), the electronic chalkboard system may have a pointing device that senses an infrared signal discharged by a panel. However, the foregoing implementation is an example, and the electronic chalkboard system may be implemented by other types of pointing devices and display apparatuses.

SUMMARY

According to an aspect of an embodiment, there is provided an electronic chalkboard system including: a plurality of display panels; a pointing device which touches the plurality of panels; an image processor which processes an image to be displayed on one of the plurality of panels that is drawn by the pointing device touching the one of the plurality of panels; a controller which selects one of the plurality of panels according to a preset condition based on a first panel of the plurality of panels if the first panel is touched by the pointing device, and controls the image processor to display on the selected panel a menu related to the image displayed on the first panel; and wherein, if a second panel of the plurality of panels is touched by the pointing device while the menu is displayed on the selected panel, the controller newly selects one of the plurality of panels according to the preset condition based on the second panel and transfers the displayed menu to the newly-selected panel.

The controller may select the second panel when selecting one of the plurality of panels based on the second panel and thus display the image and menu on the same panel.

The controller may select a third panel that is adjacently provided to the second panel when selecting one of the plurality of panels based on the second panel and thus display the image and menu on different panels.

The plurality of panels may be arranged in parallel with one another along a matrix direction, and the third panel may be provided in one of four directions of upper, lower, left and right directions of the second panel.

The menu may include at least one option for changing characteristics of the image.

The characteristics of the image may include at least one of width of a line, color, style, brightness, saturation and contrast.

The pointing device may calculate coordinate information of a touched location when one of the plurality of panels is touched, and the image processor may display the image on one of the plurality of panels based on the coordinate information calculated by the pointing device.

The electronic chalkboard system may further including a plurality of backlight units which generates and emits light to the plurality of panels, wherein the plurality of backlight units may be driven by different preset driving frequencies, and the pointing device may include a first sensor to sense the driving frequencies of the backlight units.

The pointing device may transmit the driving frequencies sensed by the first sensor, to the controller, and the controller may identify the panel touched by the pointing device, according to the driving frequencies transmitted by the pointing device.

The pointing device may acquire ID information of the panel corresponding to the driving frequency that has been sensed by the first sensor, and may transmit the acquired ID information to the controller.

The panel may include a pattern layer in which different patterns are formed according to coordinates corresponding to respective pixels, and the pointing device may include a second sensor to sense the pattern to calculate the coordinate information based on the pattern formed in the touched location.

The second sensor may sense the pattern through infrared rays.

According to an aspect of another exemplary embodiment, there is provided a display apparatus including: a plurality of display panels; an image processor which processes an image to be displayed on one of the plurality of panels that is drawn by a pointing device touching the one of the plurality of panels; a controller which selects one of the plurality of panels according to a preset condition based on a first panel of the plurality of panels if the first panel is touched by the pointing device, and controls the image processor to display on the selected panel a menu related to the image displayed on the first panel, wherein, if a second panel of the plurality of panels is touched by the pointing device while the menu is displayed on the selected panel, the controller newly selects one of the plurality of panels according to the preset condition based on the second panel and transfers the displayed menu to the newly-selected panel.

The controller may select the second panel when selecting one of the plurality of panels based on the second panel and thus display the image and menu on the same panel.

The controller may select a third panel that is adjacently provided to the second panel when selecting one of the plurality of panels based on the second panel and thus display the image and menu on different panels.

The plurality of panels may be arranged in parallel with one another along a matrix direction, and the third panel may be provided in one of four directions of upper, lower, left and right directions of the second panel.

The menu may include at least one option for changing characteristics of the image.

The characteristics of the image may include at least one of width of a line, color, style, brightness, saturation and contrast.

The pointing device may calculate coordinate information of a touched location when one of the plurality of panels is touched, and the image processor may display the image on one of the plurality of panels based on the coordinate information calculated by the pointing device.

The display apparatus may further including a plurality of backlight units which generates and emits light to the plurality of panels, wherein the plurality of backlight units may be driven by different preset driving frequencies, and the controller may identify the panel touched by the pointing device according to the driving frequencies sensed by the pointing device.

The panel may include a pattern layer in which different patterns are formed according to coordinates corresponding to respective pixels, and the controller may control the image to be displayed on the basis of the coordinate information according to the pattern sensed by the pointing device.

According to an aspect of another exemplary embodiment, there is provided a control method of an electronic chalkboard system which includes a display apparatus including a plurality of display panels, and a pointing device touching the plurality of display panels, the control method including: touching a first panel of the plurality of panels by the pointing device; displaying by the display apparatus on the first panel an image drawn on the first panel by the pointing device, selecting one of the plurality of panels according to a preset condition based on the first panel and displaying on the selected panel a menu related to the image displayed on the first panel; touching a second panel of the plurality of panels by the pointing device; and displaying by the display apparatus on the second panel an image drawn on the second panel by the pointing device, newly selecting one of the plurality of panels according to the preset condition based on the second panel and transferring the displayed menu to the newly-selected panel.

The selecting one of the plurality of panels according to the preset condition based on the second panel may include selecting the second panel to display the image and menu on the same panel.

The selecting one of the plurality of panels according to the present condition based on the second panel may include selecting a third panel that is adjacently provided to the second panel to display the image and menu on different panels.

The plurality of panels may be arranged in parallel with one another along a matrix direction, and the third panel may be provided in one of four directions of upper, lower, left and right directions of the second panel.

The menu may include at least one option for changing characteristics of the image.

The characteristics of the image may include at least one of width of a line, color, style, brightness, saturation and contrast.

BRIEF DESCRIPTION OF THE DRAWINGS

The above and other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
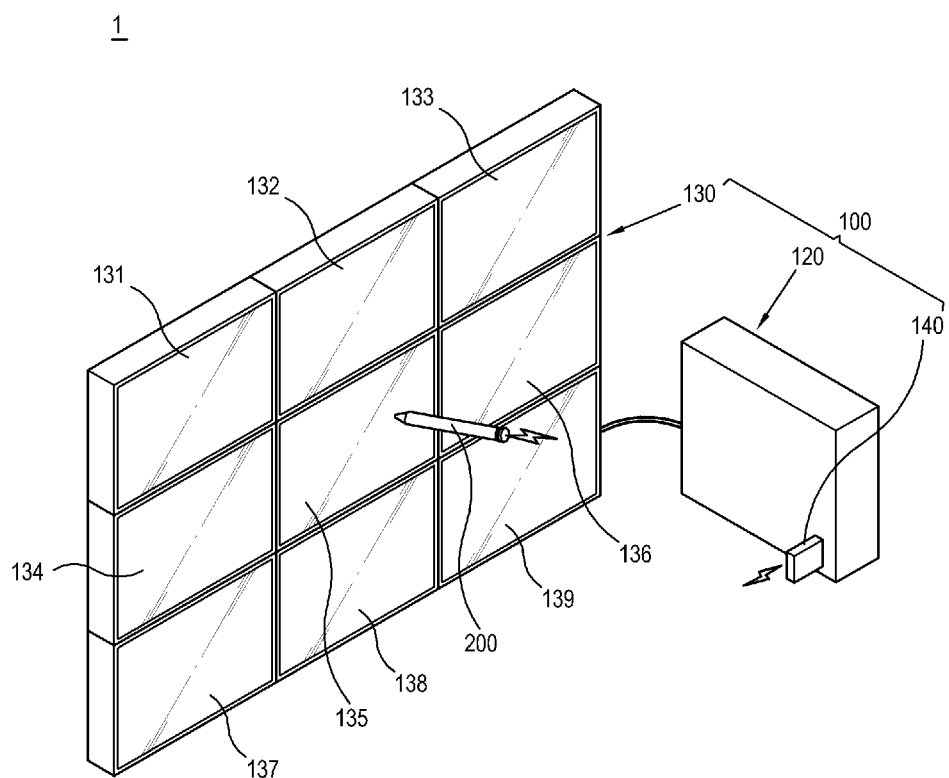
FIG. 1 illustrates an example of an electronic chalkboard system according to a first exemplary embodiment.

Below, various exemplary embodiments will be described in detail with reference to the accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates an example of an electronic chalkboard system 1 according to a first exemplary embodiment.

As shown therein, the electronic chalkboard system 1 may include a display apparatus 100 that displays an image and a pointing device 200 that touches various locations on a display unit 130.

The display apparatus 100 may be implemented as a TV or a computer monitor including a display unit 130, and is not limited to a particular implementation type. The display apparatus 100 according to an embodiment includes the display unit 130 including a plurality of display panels 131, 132, 133, 134, 135, 136, 137, 138, and 139 that form a large screen. The plurality of display panels 131, 132, 133, 134, 135, 136, 137, 138, and 139 may be affixed to a wall or stand on the ground and may be arranged in parallel in a matrix.

In FIG. 1, the display unit 130 includes 9 display panels 131, 132, 133, 134, 135, 136, 137, 138, and 139, but this is merely an example and the number of the display panels 131, 132, 133, 134, 135, 136, 137, 138, and 139 may vary. The flat or substantially flat surface of the display panels 131 to 139 may be touched by the pointing device 200.

In FIG. 1, the display apparatus 100 includes a separate image processor 120 and display unit 130. For example, the image processor 120 may be implemented as a computer main body such as a desktop computer or a laptop computer. The image processor 120 may have a device communication unit 130 which is mounted in the image processor 120 and implemented as a dongle or module to communicate with the pointing device 200.

However, according to another exemplary embodiment the display apparatus 100 may include the image processor 120 and the display unit 130 accommodated in a single housing (not shown). In this case, the device communication unit 140 may be built in the housing.

The pointing device 200 may be gripped by a user and touches a flat or substantially flat surface of the display panel 135 of the plurality of display panels 131, 132, 133, 134, 135, 136, 137, 138, and 139. The pointing device 200 may calculate coordinate information of the location on the display panel 135 touched by the pointing device 200.

The pointing device 200 may calculate coordinate information corresponding to the location on the display panel 135 touched by the pointing device 200, and wirelessly transmit the calculated coordinate information to the image processor 120 through the device communication unit 140. The image processor 120 may display the corresponding image on the display panel 135 that has been touched by the pointing device 200, among the plurality of display panels 131, 132, 133, 134, 135, 136, 137, 138, and 139.

Thus, if a user grips the pointing device 200 and touches a predetermined location on the display panels 131, 132, 133, 134, 135, 136, 137, 138, and, the image corresponding to the touched location may be displayed on the display panels 131, 132, 133, 134, 135, 136, 137, 138, and by the image processor 120.

Hereinafter, specific elements of the electronic chalkboard system 1 will be described with reference to FIG. 2, which is a block diagram of the display apparatus 100 of the electronic chalkboard system 1.

As shown therein, the display apparatus 100 according to an embodiment includes an image receiver 110 that receives image signals/image data supplied from the outside, the image processor 120 that processes an image signal transmitted by the image receiver 110, according to a preset image processing operation, a display unit 130 that includes the plurality of display panels 131, 132, 133, 134, 135, 136, 137, 138, and 139 and displays the image signal processed by the image processor 120, the device communication unit 140 that communicates with the pointing device 200, a user input unit 150 that may be manipulated by a user to output a preset command, and a device controller 160 that controls overall operations of the display apparatus 100.

Hereinafter, elements of the display apparatus 100 will be described in detail.

The image receiver 110 may receive, and transmit to the image processor 120, image signals/image data in a wired or wireless manner, and may be implemented as various types corresponding to a standard of a received image signal. For example, the image receiver 110 may receive a radio frequency (RF) signal or image signals according to standards such as composite/component video, super video, SCART, high definition multimedia interface (HDMI), DisplayPort, unified display interface (UDI) or wireless HD.

The image processor 120 may process an image signal according to preset various image processing operations, and output the processed image signal to the display unit 130 to display an image on the display unit 130. The type of the image processing operations of the image processor 120 may include a decoding operation corresponding to various image formats, a de-interlacing operation, a frame refresh rate conversion operation, a scaling operation, a noise reduction operation for improving an image quality, a detail enhancement operation, etc., but not limited thereto.

Upon receiving identification (ID) information and coordinate information of the display panels 131, 132, 133, 134, 135, 136, 137, 138, and 139 from the device controller 160, the image processor 120 may display an image corresponding to the coordinate information on the display panels 131, 132, 133, 134, 135, 136, 137, 138, and 139 corresponding to the ID information. For example, if the image processor 120 determines that the ID information provided by the device controller 160 corresponds to the first panel 131, it generates, and displays on the first panel 131, an image illustrating lines or points according to the coordinate information provided by the device controller 160.

The image processor 120 may be implemented as a computer main body including a main board (not shown) in which a central processing unit (CPU) (not shown), a graphics card (not shown), a storage medium (not shown) and other option cards (not shown) are mounted, but not limited thereto.

The display unit 130 includes the plurality of display panels 131, 132, 133, 134, 135, 136, 137, 138, and 139. The display panels 131, 132, 133, 134, 135, 136, 137, 138, and 139 display an image on their flat or substantially flat surface based on an image signal output by the image processor 120. The display panels 131, 132, 133, 134, 135, 136, 137, 138, and 139 according to an embodiment may be implemented as a liquid crystal display (LCD) panel. A detailed configuration of the display unit 130 will be described later.

The device communication unit 140 may communicate with the pointing device 200 wirelessly, and transmit data from the pointing device 200 to the device controller 160. For example, the device communication unit 140 may receive data based on RF communication standards such as Zigbee, and receive data from the pointing device 200 through a particular frequency band, i.e., a preset wireless communication channel.

The user input unit 150 may transmit various preset control commands or information to a controller 170 according to a user's manipulation and input. The user input unit 150 is may be implemented as a menu key or an input panel installed on an external side of the display apparatus 100 or as a remote controller that is physically separated from the display apparatus 100. Otherwise, the user input unit 150 may be implemented integrally in the display unit 130. That is, if the display panels 131, 132, 133, 134, 135, 136, 137, 138, and 139 include a touch screen, a user may transmit a preset command to the device controller 160 through an input menu (not shown) displayed on the display panels 131 to 139.

If the pointing device 200 touches one of the display panels 131, 132, 133, 134, 135, 136, 137, 138, and 139 and data according to the touch result is transmitted by the pointing device 200 through the device communication unit 140, the device controller 160 controls the image processor 120 to display an image according to the received data. For example, according to the data transmitted by the pointing device 200, the device controller 160 may determine the touched display panel among the plurality of display panels 131, 132, 133, 134, 135, 136, 137, 138, and 139 touched by the pointing device 200 and determine the touched coordinates of the identified display panel. The device controller 160 controls the display panels 131, 132, 133, 134, 135, 136, 137, 138, and 139 to display an image according to the determination result.

Hereinafter, a more detailed configuration of the display unit 130 will be described with reference to FIG. 3, which is a block diagram of the display unit 130.

The plurality of display panels 131, 132, 133, 134, 135, 136, 137, 138, and 139 according to an embodiment may be implemented as an LCD panel. The plurality of display panels 131, 132, 133, 134, 135, 136, 137, 138, and 139 may not generate light by themselves and thus the display unit 130 may further include a plurality of backlight units 131a, 132a, 133a, 134a, 135a, 136a, 137a, 138a, and 139a that generates and supplies light to the plurality of display panels 131, 132, 133, 134, 135, 136, 137, 138, and 139 to thereby display an image on the display panels 131, 132, 133, 134, 135, 136, 137, 138, and 139.

The backlight units 131a, 132a, 133a, 134a, 135a, 136a, 137a, 138a, and 139a may include a light source (not shown) that generates light, a light guiding plate (not shown) that changes directions and characteristics of light generated by the light source, a reflection sheet (not shown), and an optical sheet (not shown). Particularly, the light source may be implemented as a light emitting diode (LED), and controlled by pulse-width modulation (PWM) to generate light and change brightness of light. That is, driving the backlight units 131a, 132a, 133a, 134a, 135a, 136a, 137a, 138a, and 139a may mean driving the light source included in the backlight units 131a, 132a, 133a, 134a, 135a, 136a, 137a, 138a, and 139a.

Regarding the driving of the backlight units 131a, 132a, 133a, 134a, 135a, 136a, 137a, 138a, and 139a, the width of a duty ratio may be controlled by the PWM and the brightness level of light supplied by the backlight units 131a, 132a, 133a, 134a, 135a, 136a, 137a, 138a, and 139a to the display panels 131, 132, 133, 134, 135, 136, 137, 138, and 139 may be adjusted. However, the driving frequency of the backlight units 131a, 132a, 133a, 134a, 135a, 136a, 137a, 138a, and 139a according to the PWM control may not affect the brightness level of light. That is, even if the driving frequency differs with respect to the backlight units 131a, 132a, 133a, 134a, 135a, 136a, 137a, 138a, and 139a, respectively, the brightness level of light generated by the backlight units 131a, 132a, 133a, 134a, 135a, 136a, 137a, 138a, and 139a may be equal, and there may be no brightness variation in images displayed on the display panels 131, 132, 133, 134, 135, 136, 137, 138, and 139.

Accordingly, if the driving frequency of the backlight units 131a, 132a, 133a, 134a, 135a, 136a, 137a, 138a, and 139a corresponding to the plurality of display panels 131, 132, 133, 134, 135, 136, 137, 138, and 139 is set differently and the driving frequency of one of the backlight units 131a, 132a, 133a, 134a, 135a, 136a, 137a, 138a, and 139a is detected, one of the display panels 131, 132, 133, 134, 135, 136, 137, 138, and 139 may be identified based on the detected driving frequency.

The display panels 131, 132, 133, 134, 135, 136, 137, 138, and 139 which are touched by the pointing device 200 may be identified based on the foregoing principle, and the detailed description will be provided later.

Hereinafter, the display panel 300 according to the present embodiment will be described with reference to FIG. 4, which is a sectional view of the display panel 300.

Figure 2:
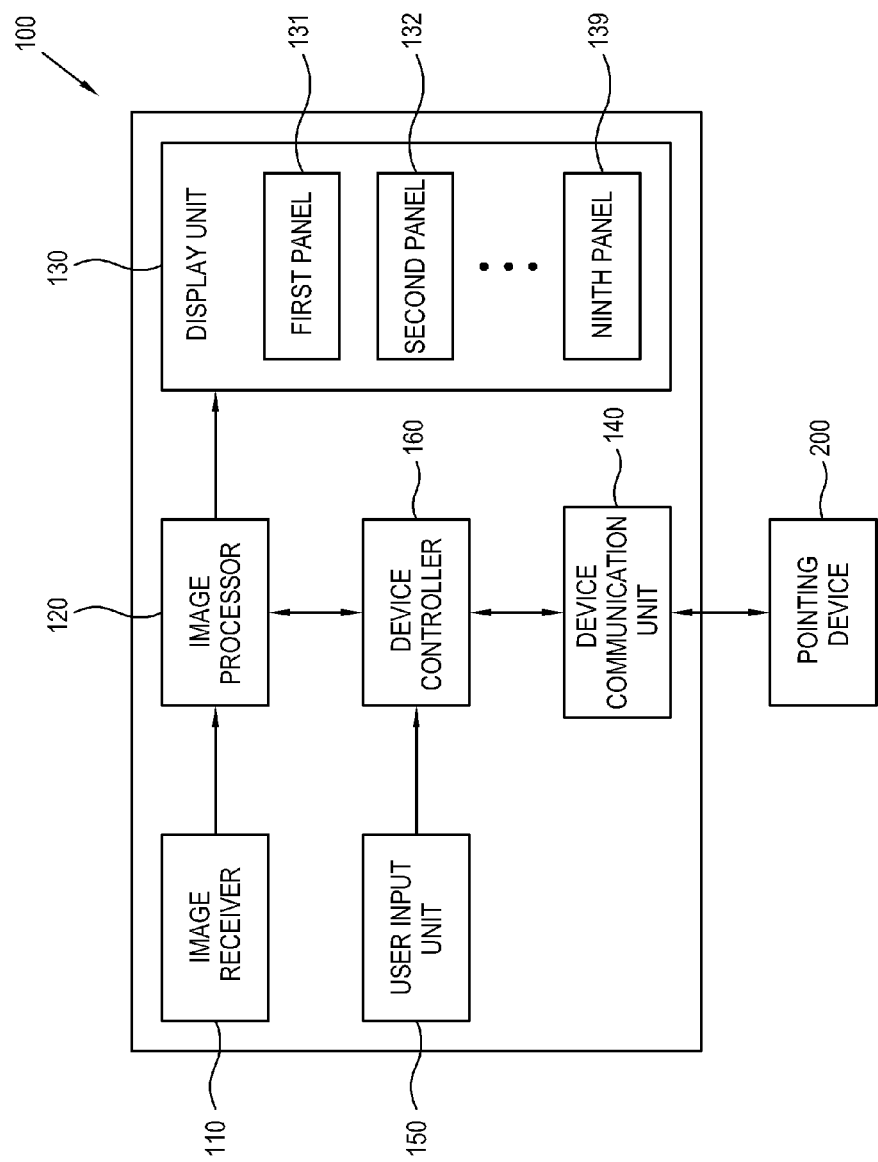
FIG. 2 is a block diagram of a display apparatus of the electronic chalkboard system in FIG. 1 according to an exemplary embodiment.
Figure 3:
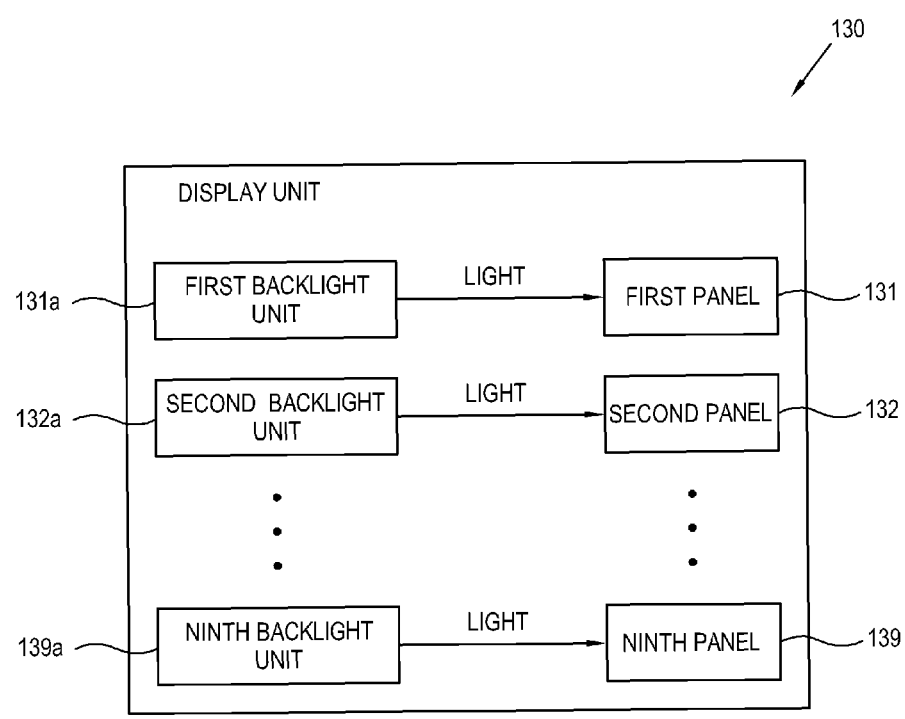
FIG. 3 is a block diagram of a display unit of the display apparatus in FIG. 2 according to an exemplary embodiment.
Figure 4:
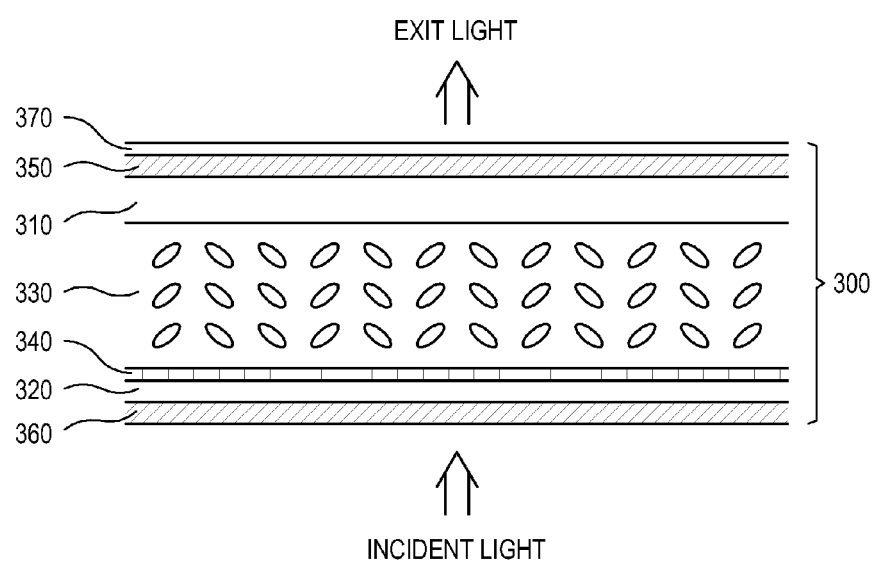
FIG. 4 is a sectional view of one of display panels of the display apparatus in FIG. 2 according to an exemplary embodiment.

The display panel 300 in FIG. 4 has the same configuration as the display panels 131, 132, 133, 134, 135, 136, 137, 138, and 139 in FIGS. 1, 2, and 3, and the configuration in FIG. 4 is an example of configurations which may be implemented by various LCD panels. If the display panel 300 in FIG. 4 is implemented as a product, the configuration of the product is not limited to the configuration in FIG. 4. Within the scope of the concept of the embodiment, the configuration of the display panel 300 may vary in design.

As shown therein, the display panel 300 may include an upper substrate 310, a lower substrate 320 which faces the upper substrate 310, a liquid crystal layer 330 which is filled between the upper and lower substrates 310 and 320, a color filter layer 340 which is interposed between the liquid crystal layer 330 and the lower substrate 320, polarizing films 350 and 360 which are provided above and below the upper and lower substrates 310 and 320, and a reflection restricting film 370 which is provided on the upper polarizing film 350.

The upper and lower substrates 310 and 320 are transparent substrates that face each other and are spaced apart by a predetermined distance, along a progressive direction of light. The upper and lower substrates 310 and 320 may include glass or plastic substrates. The upper and lower substrates 310 and 320 may have different characteristics depending on the driving method of the liquid crystal layer 330. For example, if the liquid crystal layer 330 is a passive matrix type, soda lime glass may be used. If the liquid crystal layer 330 is an active matrix type, alkali free glass and borosilicate glass may be used.

The liquid crystal layer 330 may be interposed between the upper and lower substrates 310 and 320, and adjusts transmission of light by changing arrangement of liquid crystal according to a driving signal. An electrode layer (not shown) that includes a transparent material such as conductive indium tin oxide (ITO) or indium zinc oxide (IZO) may be formed between the upper substrate 310 and the liquid crystal layer 330 or between the lower substrate 320 and the liquid crystal layer 330 to transmit a driving signal.

Normal liquid does not have regularity regarding the direction and arrangement of molecules while liquid crystal is similar to a liquid phase which has regularity to some extent. For example, a certain solid becomes a liquid phase representing an anisotropic nature such as double refraction if melted by heat. Liquid crystal has optical features such as double refraction or color change. Regularity is a nature of crystal and a phase of material is similar to liquid and thus the material having those two natures is called liquid crystal. If a voltage is applied to the liquid crystal, the arrangement of molecules is changed and the optical feature is changed.

The liquid crystal of the liquid crystal layer 330 may be classified as nematic, cholesteric, smectic, or ferroelectric liquid crystals depending on the arrangement of molecules.

The color filter layer 340 may be interposed between the liquid crystal layer 330 and the lower substrate 320, or between the liquid crystal layer 330 and the upper substrate 310, and filters incident light to emit a predetermined color light to each cell of the liquid crystal layer 130.

The polarizing films 350 and 360 may polarize unpolarized light in a particular direction, and transmit light vibrating in a certain direction only, and absorb light vibrating in other directions. The polarizing films 350 and 360 may adjust the strength of transmitted light depending on the degree of rotation of incident light to a polarizing axis and allow expression of gray scale for a user to identify an image on the display panel 300.

The polarizing films 350 and 360 according to an embodiment may be provided on the upper side of the upper substrate 310 and the lower side of the lower substrate 320, respectively, but not limited thereto. Alternatively, the polarizing films 350 and 360 may be installed in one of the two aforementioned sides.

The reflection restricting film 370 may be provided on the top of the display panel 300. The reflection restricting film 370 functions to reduce glare by reducing the surface reflection due to external light. The reflection restricting film 370 may be implemented as an anti-glare film or an anti-reflection film. Otherwise, silicon particles may be sprayed on the polarizing film 350 to perform the anti-glare treatment instead of using the reflection restricting film 370 in the display panel 300.

Figure 5:
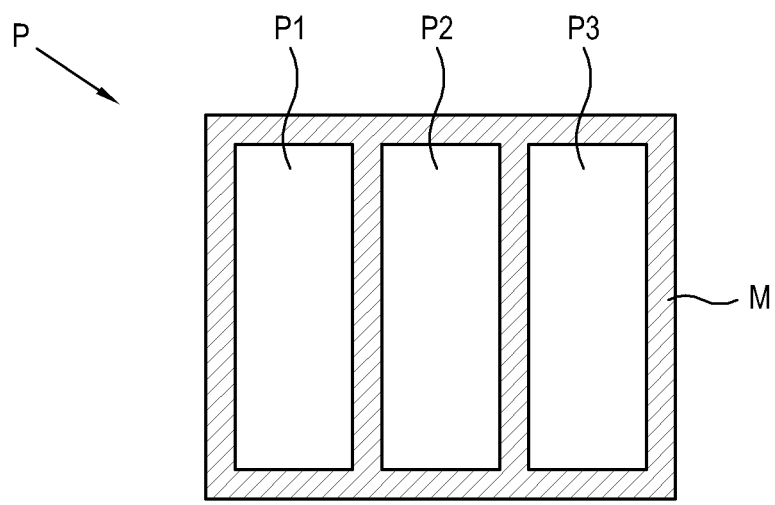
FIG. 5 is an enlarged plan view of a pixel of the display panel in FIG. 4 according to an exemplary embodiment.

FIG. 5 is an enlarged plan view of one of a plurality of pixels P in the color filter layer 340.

As shown therein, a pixel P may include three sub pixels P1, P2, and P3 corresponding to a plurality of colors, e.g., three colors of RGB. That is, the pixel P includes a red sub pixel P1 corresponding to a light exit area of a red color, a green sub pixel P2 corresponding to a light exit area of a green color, and a blue sub pixel P3 corresponding to a light exit area of a blue color.

The color filter layer 340 may convert light entering the display panel 300 into RGB colors and transmit the light to the liquid crystal layer 330. Each pixel P filters the sub pixels P1, P2, and P3 corresponding to the RGB colors by color. When light passes through the sub pixels P1, P2, and P3, light in different colors exits to each sub pixel by the color filter layer 340.

A mask M, frame M, or grid M may be formed on the color filter layer 140 corresponding to the sub pixels P1, P2, and P3 to distinguish the pixels P or sub pixels P1, P2, and p3 in the pixels P. Various preset patterns (not shown) may be formed on the mask M. The patterns may be formed on the mask M in various forms, such as engraved, embossed in the mask M or projecting from the mask M to the inside the sub pixels P1, P2, and P3 or projecting from the mask M in a direction parallel to the light exit direction.

If different patterns (not shown) are formed on the masks M to the pixels P in the display panel 300 and the pattern of the mask M of one of the pixels P is detected, the location of the pixel P in the display panel 300 may be identified based on the detected pattern.

Coordinate information of the location on the display panel 300 touched by the pointing device 200 identified by the foregoing principle may be calculated, and this will be described in detail later.

FIG. 5 illustrates the case where the pattern is formed on the mask M on the sub pixels P1, P2, and P3, but embodiments are not limited to the foregoing. For example, a pattern layer (not shown) which has patterns corresponding to each pixel P across the flat or substantially flat surface of the display panel 300 may be provided on the upper substrate 310.

Figure 6:
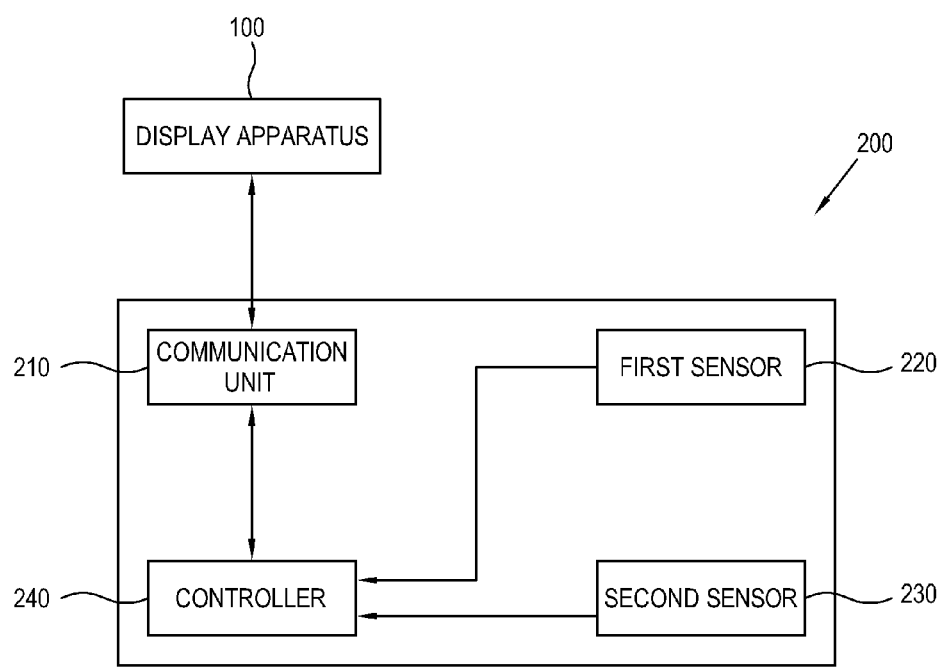
FIG. 6 is a block diagram of a pointing device of the electronic chalkboard system in FIG. 1 according to an exemplary embodiment.

Hereinafter, a configuration of the pointing device 200 according to an embodiment will be described in detail with reference to FIG. 6, which is a block diagram of the pointing device 200.

As shown therein, the pointing device 200 may include a communication unit 210 that communicates with the display apparatus 100, a first sensor 220 that is used to identify the display panels 131, 132, 133, 134, 135, 136, 137, 138, and 139 touched by the pointing device 200, a second sensor 230 that is used to calculate coordinate information of the location touched by the pointing device 200, and a controller 240 that identifies the display panels 131, 132, 133, 134, 135, 136, 137, 138, and 139 touched by the pointing device 200 and calculates coordinate information of the touched location, according to the detection result of the first and second sensors 220 and 230.

The communication unit 210 may transmit predetermined data to the display apparatus 100 by a control of the controller 240, according to a preset communication standard between the display apparatus 100 and the pointing device 200.

If the pointing device 200 touches one of the plurality of display panels 131, 132, 133, 134, 135, 136, 137, 138, and 139, the first sensor 220 may sense a driving frequency of the backlight units 131a, 132a, 133a, 134a, 135a, 136a, 137a, 138a, and 139a (refer to FIG. 3) that supply light to the display panels 131, 132, 133, 134, 135, 136, 137, 138, and 139 (refer to FIG. 3). To do the foregoing, the first sensor 220 may be implemented as a photo sensor or a brightness sensor that senses light flickering.

If the pointing device 200 touches one of the plurality of display panels 131, 132, 133, 134, 135, 136, 137, 138, and 139, the second sensor 230 may sense a pattern (not shown) corresponding to the touched location on the display panels 131, 132, 133, 134, 135, 136, 137, 138, and 139. The pattern is the same as that which has been described in FIG. 5. The second sensor 230 includes an infrared sensor so that its sensing operation is not disturbed by light which is transmitted through the display panels 131, 132, 133, 134, 135, 136, 137, 138, and 139. The second sensor 230 may sense a shadow formed by the pattern to thereby sense the pattern corresponding to the touched place.

The controller 240 may identify the display panel of the plurality of display panels 131, 132, 133, 134, 135, 136, 137, 138, and 139 touched by the pointing device 200, based on the sensing result of the first sensor 220. The controller 240 may determine coordinate information of the location touched by the pointing device 200 on the display panel based on the sensing result of the second sensor 230.

For example, if the pointing device 200 touches the first panel 131, the controller 240 calculates the driving frequency according to the flickering period of light that is sensed by the first sensor 220, and may determine that the calculated driving frequency corresponds to the first backlight unit 131a (refer to FIG. 3). Such determination may be based on the driving frequency and a correlation table (not shown) of the backlight units 131a, 132a, 133a, 134a, 135a, 136a, 137a, 138a, and 139a stored in the pointing device 200. By identifying the first backlight unit 131a, the controller 240 may determine that the pointing device 200 touches the first panel 131.

If the first panel 131 of the plurality of display panels 131 to 139 is identified, the controller 240 determines which coordinate the pattern (not shown) sensed by the second sensor 230 corresponds to on the first panel 131. Such determination may be based on the pattern and a correlation table (not shown) of coordinates stored in the pointing device 200.

The controller 240 transmits the obtained ID information and coordinate information of the first panel 131 to the display apparatus 100.

The device controller 160 (refer to FIG. 2) of the display apparatus 100 may determine whether to display a corresponding image in a location on of one of the plurality of display panels 131, 132, 133, 134, 135, 136, 137, 138, and 139 that is determined based on the ID information and coordinate information transmitted by the pointing device 200.

In the present embodiment, the pointing device 200 transmits the ID information of the display panels 131, 132, 133, 134, 135, 136, 137, 138, and 139 to the display apparatus 100, but the concept of the present embodiment is not limited to the foregoing. For example, the pointing device 200 may transmit driving frequency information sensed by the first sensor 220, to the display apparatus 100, and the device controller 160 may identify the display panels 131, 132, 133, 134, 135, 136, 137, 138, and 139 based on the received driving frequency information.

If an image is displayed on one of the display panels 131, 132, 133, 134, 135, 136, 137, 138, and 139 corresponding to the location touched by the pointing device 200, characteristics of the corresponding image should be changed.

Figure 7:
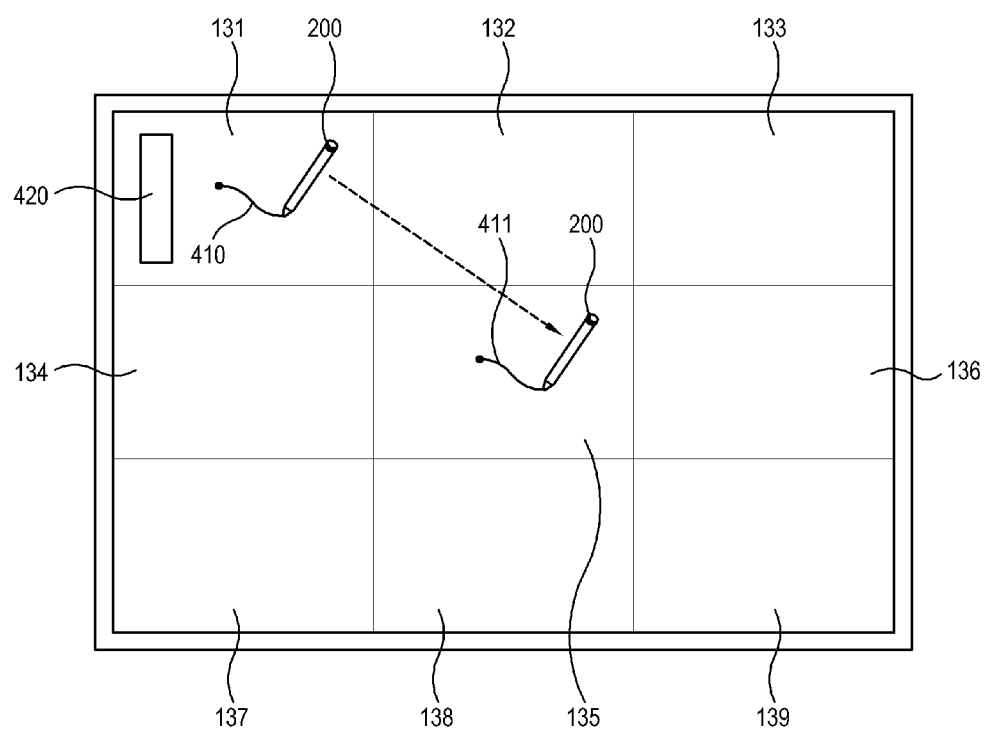
FIG. 7 illustrates an example of displaying an image on the display panel corresponding to a touch of the pointing device to the display panel in the electronic chalkboard system in FIG. 1 according to an exemplary embodiment.

FIG. 7 illustrates an example of displaying a corresponding image on the display panels 131, 132, 133, 134, 135, 136, 137, 138, and 139 when the pointing device 200 touches the display panels 131, 132, 133, 134, 135, 136, 137, 138, and 139.

As shown therein, if a user grips the pointing device 200 and touches the first panel 131, an image 410 corresponding to the touch of the pointing device 200 may be displayed on the first panel 131.

The device controller 160 may display an image of a menu 420 on the first panel 131 to change various characteristics of the image 410. The menu 420 may provide various options to change an image corresponding to a touch of the pointing device 200, e.g., line width, color, style, brightness, saturation and contrast of an image corresponding to a motion trajectory of the pointing device 200, and include icons (not shown) or text windows (not shown) to change the options. A user may adjust the options provided by the menu 420 through the user input unit 150 so that the device controller 160 changes the characteristics of the image 410 and displays the image 410 with the changed characteristics.

If a user moves and the pointing device 200 touches, e.g., the fifth panel 135 according to such movement, the device controller 160 may display a corresponding image 411 on the fifth panel 135.

The electronic chalkboard system 1 may include the plurality of display panels 131, 132, 133, 134, 135, 136, 137, 138, and 139 to form a large screen. Thus, if a user desires to adjust characteristics of the image 411 displayed on the fifth panel 135 but the menu 420 is displayed on the first panel 131, such distance may cause inconvenience for a user who wishes to access the menu 420. That is, if the menu 420 is fixed and displayed on only one of the plurality of display panels 131, 132, 133, 134, 135, 136, 137, 138, and 139, a user may be inconvenienced in adjusting the characteristics of the image 411.

Therefore, an embodiment may include the following configuration.

Figure 8:
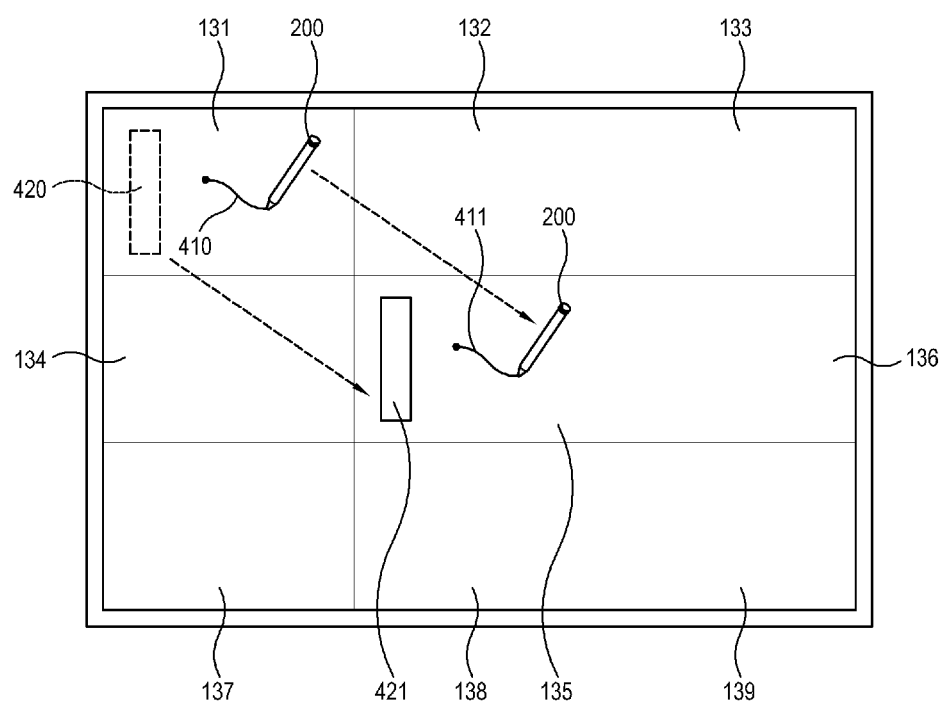
FIG. 8 illustrates an example of displaying a menu corresponding to a touch of the pointing device to the display panel in the electronic chalkboard system in FIG. 1 according to an exemplary embodiment.

FIG. 8 illustrates an example of displaying a menu 421 corresponding to the touch of the pointing device 200 to the display panels 131, 132, 133, 134, 135, 136, 137, 138, and 139.

As shown therein, if the pointing device 200 touches the first panel 131, the corresponding image 410 may be displayed on the first panel 131 and the menu 420 may also be displayed on the first panel 131. Such case will be referred to as an initial state.

If the pointing device 200 touches the fifth panel 135, the corresponding image 411 may be displayed on the fifth panel 135. As the pointing device 200 touches the fifth panel 135, the device controller 160 may display the menu 421 on the fifth panel 135 rather than the menu 420 displayed on the first panel 131. The menu 420 of the first panel 131 and the menu 421 of the fifth panel 135 provide substantially similar options but have different reference numerals due to different display locations.

Accordingly, even if the display panel 135 of the plurality of display panels 131, 132, 133, 134, 135, 136, 137, 138, and 139 that is touched by the pointing device 200 is changed, the menu 421 may be displayed on the changed display panel 135 and a user may easily adjust the characteristics of the corresponding image 411.

In the previous drawings, if the pointing device 200 touches the fifth panel 135, the corresponding image 411 and the menu 421 may be displayed on the same fifth panel 135. However, in this case, the menu 421 may interfere with the touch of the pointing device 200 to the corresponding image 411 displayed on the fifth panel 135.

That is, the menu 421 may already be displayed on the location that a user desires to touch with the pointing device 200, or the menu 421 may be overlaid on and hide the corresponding image 411.

A second embodiment may include the following configuration.

Figure 9:
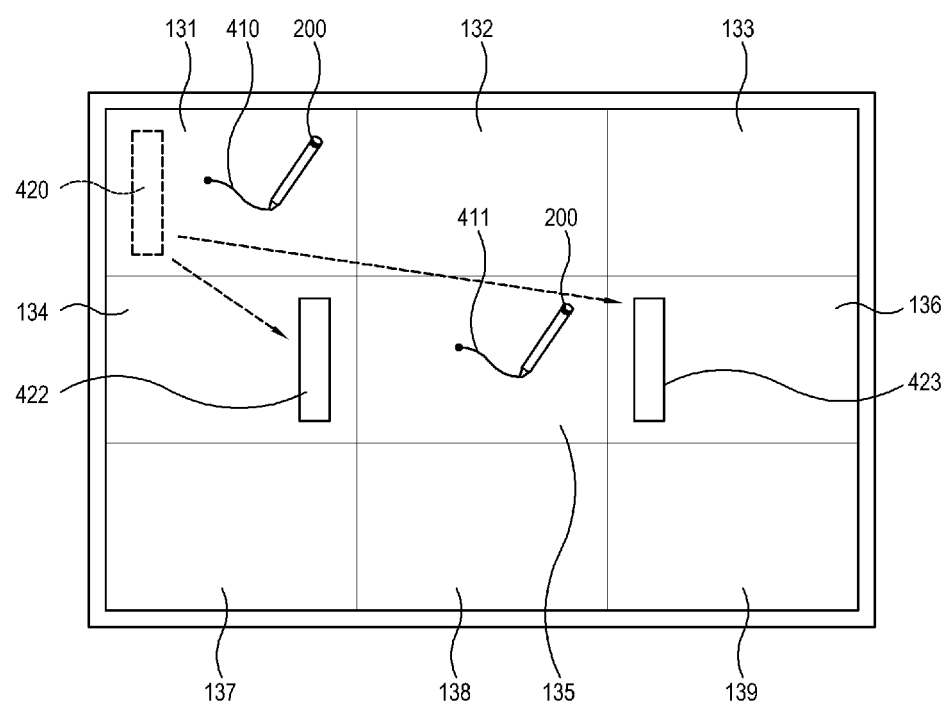
FIG. 9 illustrates an example of displaying a menu corresponding to a touch of a pointing device to a display panel according to a second exemplary embodiment.

FIG. 9 illustrates an example of displaying menus 422 and 423 corresponding to a touch of the pointing device 200 to the display panels 131, 132, 133, 134, 135, 136, 137, 138, and 139 according to a second embodiment.

As shown therein, as the pointing device 200 touches the first panel 131, the corresponding image 410 may be displayed on the first panel 131 and the menu 420 may also be displayed on the first panel 131. This case will be referred to as an initial state.

If the pointing device 200 touches the fifth panel 135, the corresponding image 411 may be displayed on the fifth panel 135. When the pointing device 200 touches the fifth panel 135, the device controller 160 may select one of the panels 132, 134, 136, and 138 that are respectively situated above, left, right, and below the fifth panel 135.

The device controller 160 may display the menus 422 and 423 on one or more of the display panels 132, 134, 136, and 138 which have been selected earlier, rather than displaying the menu 420 on the first panel 131.

In FIG. 9, the menus 422 and 423 are shown on the fourth panel 134 and the sixth panel 136, but this does not necessarily mean that the two menus 422 and 423 are displayed simultaneously. Instead, the menus 422 and 423 are displayed on the left and right panels 134 and 136 of the panels 132, 134, 136, and 138 which are adjacent to the fifth panel 135.

That is, the device controller 160 may display the menu 422 on the fourth panel 134 which is situated on the left side of the fifth panel 135, or the device controller 160 may display the menu 423 on the sixth panel 136 which is situated on the right side of the fifth panel 135. Otherwise, the device controller 160 may display the menus 422 and 423 on the second panel 132 which is situated above the fifth panel 135 or the eighth panel 138 which is situated below the fifth panel 135.

Selection of one of the panels 132, 134, 136, and 138 may be set in advance in the device controller 160, and the device controller 160 may select adjacent panels 132, 134, 136, and 138 in various preset orders based on the panel 135 that has been identified as being touched by the pointing device 200.

For example, if it is determined that a user is situated near the right side of the image 411 based on his/her usage behavior, the panel 423 which is located to the right side of the panel 135 that is identified as touched by the pointing device 200 may be set to be selected firstly. If there is no panel located to the right side of the identified panel 133, the panel 132 which is located to the left side of the panel 133 may be set to be selected. Such settings may vary at the design phase and embodiments are not limited to any particular settings.

As shown therein, if the menu 422 is displayed in the fourth panel 134 which is adjacent to the left side of the fifth panel 135, the menu 422 may be set to be displayed in a location on the fourth panel 134 that is adjacent to the fifth panel 135.

For example, if the menu 422 is set to be placed on the upper left side of the fourth panel 134 by default, the device controller 160 may adjust the location of the menu 422 to a different location adjacent to the fifth panel 135, e.g., on the upper right side of the fourth panel 134. This may also vary at the design phase, and embodiments are not limited to any particular manner of adjusting the location of the menu.

Figure 10:
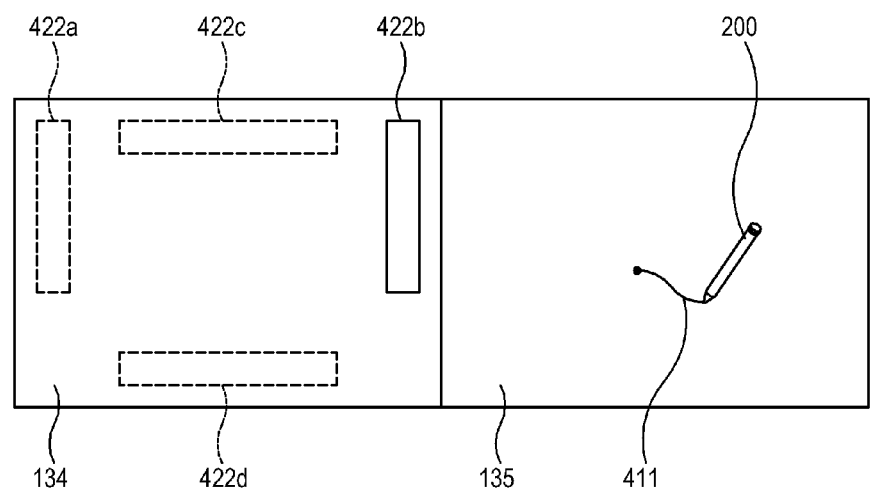
FIG. 10 illustrates an example of fourth and fifth panels of the display panels in FIG. 9 according to an exemplary embodiment.

FIG. 10 illustrates an example of the fourth panel 134 and the fifth panel 135 of the display panels 131, 132, 133, 134, 135, 136, 137, 138, and 139 in FIG. 9.

As shown therein, if it is determined that the pointing device 200 has touched the fifth panel 135, the device controller 160 may display the corresponding image 411 on the fifth panel 135.

If it is set in advance that menus 422*a*, 422*b*, 422*c* and 422*d* are displayed on the fourth panel 134 which is situated to the left side of the fifth panel 135, the device controller 160 may display the menus 422*a*, 422*b*, 422*c*, and 422*d* on the fourth panel 134.

A plurality of display locations for the menus 422*a*, 422*b*, 422*c* and 422*d* may be set, such as the left, right, upper and lower sides of the fourth panel 134. The device controller 160 displays the menus 422*a*, 422*b*, 422*c* and 422*d* in a location selected from the plurality of display locations.

If displaying the menu 422*a* on the left side of the fourth panel 134 is set as a default, the device controller 160 may display the menu 422*a* in the location set as the default. However, the displayed menu 422*a* is relatively far from the fifth panel 135 and a user may be inconvenienced when accessing the menu 422*a*.

Thus, the device controller 160 selects the location that is in the closest proximity to the fifth panel 135 that has been identified as being touched by the pointing device 200, from the plurality of preset display locations on the fourth panel 134 where the menus 422*a*, 422*b*, 422*c*, and 422*d* may be displayed. The device controller 160 displays the menu 422*b* in the selected location.

Thus, a user may easily access the menus 422*a*, 422*b*, 422*c*, and 422*d*.

Figure 11:
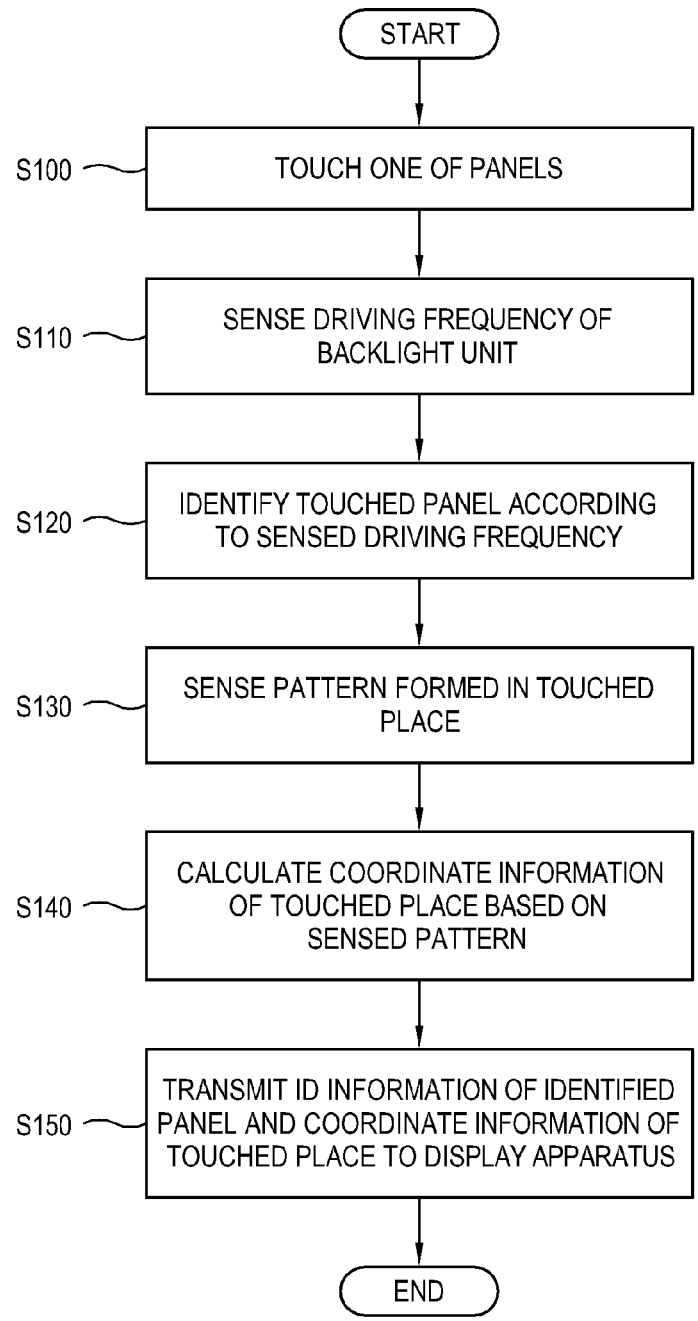
FIG. 11 is a control flowchart illustrating a control method of the pointing device of the electronic chalkboard system in FIG. 1 according to an exemplary embodiment.

Hereinafter, a control method of the pointing device 200 according to the present embodiment will be described with reference to FIG. 11, which is a control flowchart showing the control method.

As shown therein, the pointing device 200 may touch one of the plurality of display panels (S100).

The pointing device 200 may sense the driving frequency of the backlight unit which supplies light to the touched display panel (S110) and identify the touched display panel according to the sensed driving frequency (S120).

The pointing device 200 may sense the pattern formed on the touched location on the display panel (S130) and calculate the coordinate information of the touched location based on the sensed pattern (S140).

The pointing device 200 may transmit the ID information and coordinate information of the touched location of the identified display panel to the display apparatus 100 (S150).

Figure 12:
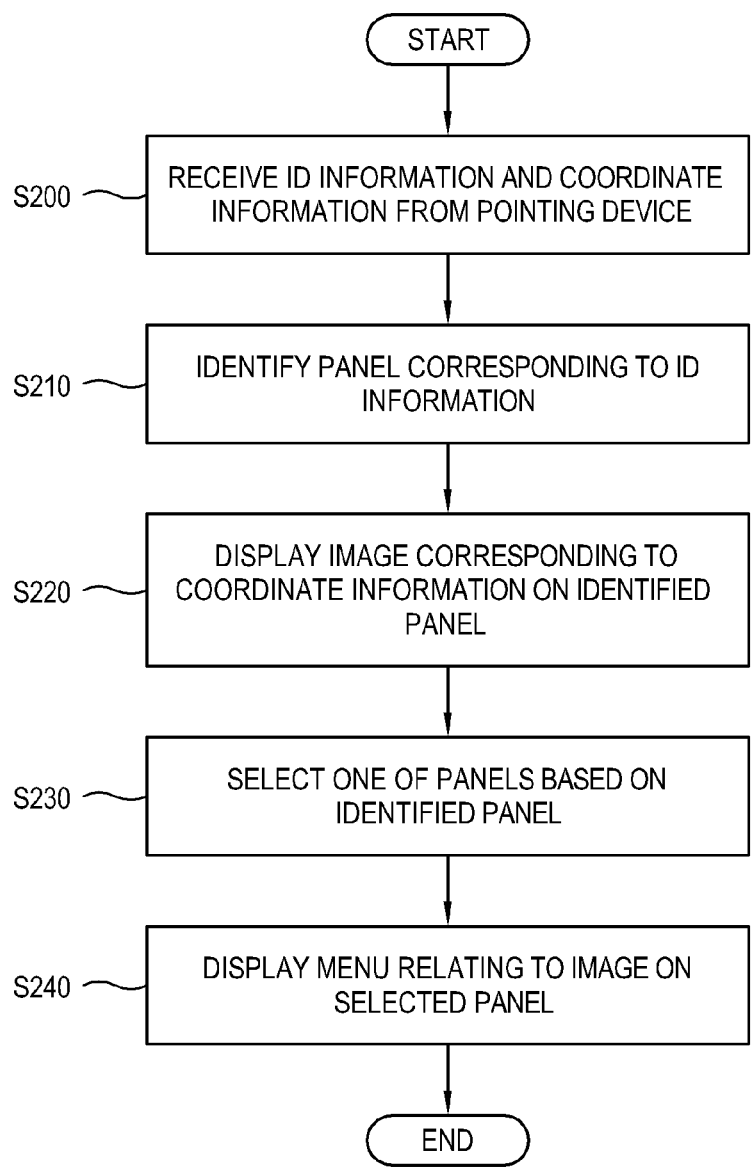
FIG. 12 is a control flowchart illustrating a control method of the display apparatus of the electronic chalkboard system in FIG. 1 according to an exemplary embodiment.

Hereinafter, a control method of the display apparatus 100 according to an embodiment will be described with reference to FIG. 12, which is a control flowchart of the control method.

As shown therein, the display apparatus 100 may receive the ID information and coordinate information from the pointing device 200 (S200).

The display apparatus 100 may identify the display panel corresponding to the ID information (S210) and display an image corresponding to the coordinate information on the display panel (S220).

The display apparatus 100 may select one of the plurality of display panels based on the identified display panel (S230). The display apparatus 100 may display a menu relating to the image on the selected display panel (S230).

As described above, according to an embodiment, the display panel of the plurality of display panels 131, 132, 133, 134, 135, 136, 137, 138, and 139 which has been touched by the pointing device 200 may be identified and one of the plurality of display panels 131, 132, 133, 134, 135, 136, 137, 138, and 139 may be selected on the basis of the identified display panel. The menu may then be displayed on the selected display panel. The "identified display panel" and the "selected display panel" may be identical or different panels depending on the design of the system or device. If the identified display panel and the selected display panel are different panels, the "selected display panel" may be situated above, below, left, or right of the "identified display panel."

Thus, even if a user moves and touches the display panels 131, 132, 133, 134, 135, 136, 137, 138, and 139 with the pointing device 200 in the electronic chalkboard system 1 which is formed as a large screen, a user may easily change the characteristics of the corresponding image.

The electronic chalkboard system according to an embodiment displays on one of the plurality of display panels an image that is drawn on that display panel by a touch of the pointing device. If a first panel of the plurality of panels is touched by the pointing device, the electronic chalkboard system selects a panel from the plurality of panels that have been specified as panels on which a menu related to the image displayed on the first panel may be displayed, when the first panel is touched by the pointing device, and displays on the selected panel the menu. Thereafter, if a second panel of the plurality of panels is touched by the pointing device while the menu is being displayed on the selected panel, the electronic chalkboard system transfers the menu to a panel selected from the panels specified as panels on which the menu related to the image displayed on the second panel may be displayed, when the second panel is touched by the pointing device.

Here, the electronic chalkboard system selects the second panel of the plurality of panels when selecting one of the plurality of panels based on the second panel, thereby displaying the image and menu on the same panel. Alternatively, the electronic chalkboard system may select a third panel situated adjacent to the second panel when selecting one of the plurality of panels based on the second panel, thereby displaying the image and menu on different panels.

Although several embodiments have been shown and described, it will be appreciated by those skilled in the art that changes may be made in these embodiments without departing from the principles and spirit of the invention, the range of which is defined in the appended claims and their equivalents.

What is claimed is:

1. An electronic chalkboard system comprising:
   a plurality of display panels;
   a pointing device;
   an image processor configured to process an image displayed on one of the plurality of display panels that is drawn by the pointing device touching the one of the plurality of display panels;
   a controller configured to, in response to a first display panel of the plurality of display panels being touched by the pointing device, select one of the plurality of display panels according to a preset condition based on the first display panel, and control the image processor to display on the selected display panel a menu related to the image displayed on the first display panel; and
   wherein, in response to a second display panel of the plurality of display panels being touched by the pointing device while the menu is displayed on the selected display panel, the controller is configured to newly select one of the plurality of display panels according to the preset condition based on the second display panel and transfer the displayed menu to the newly-selected display panel.

2. The electronic chalkboard system according to claim 1, wherein the controller is configured to select the second display panel when selecting the one of the plurality of display panels based on the second display panel and thus display the image and the menu on the same display panel.

3. The electronic chalkboard system according to claim 1, wherein the controller is configured to select a third display panel that is adjacently provided to the second display panel when selecting the one of the plurality of panels based on the second display panel and thus display the image and the menu on different display panels.

4. The electronic chalkboard system according to claim 3, wherein the plurality of display panels is arranged in parallel with one another along a matrix direction, and the third display panel is provided in one of four directions of upper, lower, left and right directions of the second display panel.

5. The electronic chalkboard system according to claim 1, wherein the menu comprises at least one option for changing characteristics of the image.

6. The electronic chalkboard system according to claim 5, wherein the characteristics of the image comprises at least one of width of a line, color, style, brightness, saturation and contrast.

7. The electronic chalkboard system according to claim 1, wherein in response to the one of the plurality of display panels being touched, the pointing device is configured to calculate coordinate information of a touched location, and the image processor is configured to display the image on the one of the plurality of display panels based on the coordinate information calculated by the pointing device.

8. The electronic chalkboard system according to claim 7, further comprising a plurality of backlight units configured to generate and emit light to the plurality of display panels, wherein the plurality of backlight units is driven by different preset driving frequencies, and the pointing device comprises a first sensor configured to sense the driving frequencies of the backlight units.

9. The electronic chalkboard system according to claim 8, wherein the pointing device is configured to transmit the driving frequencies sensed by the first sensor, to the controller, and the controller is configured to identify the display panel touched by the pointing device, according to the driving frequencies transmitted by the pointing device.

10. The electronic chalkboard system according to claim 8, wherein the pointing device is configured to acquire ID information of the display panel corresponding to the driving frequency that has been sensed by the first sensor, and transmit the acquired ID information to the controller.

11. The electronic chalkboard system according to claim 7, wherein the display panel comprises a pattern layer in which different patterns are formed according to coordinates corresponding to respective pixels, and the pointing device comprises a second sensor configured to sense the pattern to calculate the coordinate information based on the pattern formed in the touched location.

12. The electronic chalkboard system according to claim 11, wherein the second sensor is configured to senses the pattern through infrared rays.

13. A display apparatus comprising:
a plurality of display panels;
an image processor configured to process an image displayed on one of the plurality of display panels that is drawn by a pointing device touching the one of the plurality of display panels;
a controller configured to, in response to a first display panel of the plurality of display panels being touched by the pointing device, select one of the plurality of display panels according to a preset condition based on the first display panel, and control the image processor to display on the selected display panel a menu related to the image displayed on the first panel,
wherein, in response to a second display panel of the plurality of panels being touched by the pointing device while the menu is displayed on the selected display panel, the controller is configured to newly select one of the plurality of display panels according to the preset condition based on the second display panel and transfer the displayed menu to the newly-selected display panel.

14. The display apparatus according to claim 13, wherein the controller is configured to select the second display panel when selecting the one of the plurality of display panels based on the second display panel and thus display the image and the menu on the same display panel.

15. The display apparatus according to claim 13, wherein the controller is configured to select a third display panel that is adjacently provided to the second display panel when selecting the one of the plurality of display panels based on the second display panel and thus display the image and the menu on different display panels.

16. The display apparatus according to claim 15, wherein the plurality of display panels is arranged in parallel with one another along a matrix direction, and the third display panel is provided in one of four directions of upper, lower, left and right directions of the second display panel.

17. The display apparatus according to claim 13, wherein the menu comprises at least one option for changing characteristics of the image.

18. The display apparatus according to claim 17, wherein the characteristics of the image comprises at least one of width of a line, color, style, brightness, saturation and contrast.

19. The display apparatus according to claim 13, wherein in response to the one of the plurality of display panels being touched, the pointing device is configured to calculate coordinate information of a touched location, and the image processor is configured to display the image on the one of the plurality of display panels based on the coordinate information calculated by the pointing device.

20. The display apparatus according to claim 19, further comprising a plurality of backlight units configured to generate and emit light to the plurality of display panels, wherein the plurality of backlight units is driven by different preset driving frequencies, and the controller is configured to identify the display panel touched by the pointing device according to the driving frequencies sensed by the pointing device.

21. The display apparatus according to claim 19, wherein the display panel comprises a pattern layer configured to form different patterns according to coordinates corresponding to respective pixels, and the controller is configured to control the displayed image using the coordinate information according to a pattern sensed by the pointing device.

22. A control method of an electronic chalkboard system which comprises a display apparatus comprising a plurality of display panels, and a pointing device, the control method comprising:
touching a first display panel of the plurality of display panels by the pointing device;
displaying by the display apparatus on the first display panel an image drawn on the first display panel by the pointing device, selecting one of the plurality of display panels according to a preset condition based on the first display panel and displaying on the selected display panel a menu related to the image displayed on the first display panel;

touching a second display panel of the plurality of display panels by the pointing device; and displaying by the display apparatus on the second display panel an image drawn on the second display panel by the pointing device, newly selecting one of the plurality of display panels according to the preset condition based on the second display panel and transferring the displayed menu to the newly-selected display panel.

23. The control method according to claim 22, wherein the selecting the one of the plurality of display panels according to the preset condition based on the second display panel comprises selecting the second display panel to display the image and the menu on the same display panel.

24. The control method according to claim 22, wherein the selecting the one of the plurality of display panels according to the present condition based on the second display panel comprises selecting a third display panel that is adjacently provided to the second display panel to display the image and the menu on different display panels.

25. The control method according to claim 24, wherein the plurality of display panels is arranged in parallel with one another along a matrix direction, and the third display panel is provided in one of four directions of upper, lower, left and right directions of the second display panel.

26. The control method according to claim 22, wherein the menu comprises at least one option for changing characteristics of the image.

27. The control method according to claim 26, wherein the characteristics of the image comprises at least one of width of a line, color, style, brightness, saturation and contrast.

* * * * *